Jan. 6, 1970 W. A. ANDERSON 3,488,561

APPARATUS FOR CONTROLLING MAGNETIC FIELDS

Filed March 23, 1965 3 Sheets-Sheet 1

INVENTOR
WESTON A. ANDERSON
BY Wm J Nolan
ATTORNEY

INVENTOR.
WESTON A. ANDERSON
BY
ATTORNEY

INVENTOR.
WESTON A. ANDERSON
BY
ATTORNEY

United States Patent Office 3,488,561

Patented Jan. 6, 1970

3,488,561
APPARATUS FOR CONTROLLING MAGNETIC FIELDS

Weston A. Anderson, Palo Alto, Calif., assignor to Varian Associates, Palo Alto, Calif., a corporation of California Filed Mar. 23, 1965, Ser. No. 442,000
Int. Cl. H01h 47/22
U.S. Cl. 317—123 16 Claims

ABSTRACT OF THE DISCLOSURE

Apparatus is disclosed for independently controlling one or more orthogonal components of a given magnetic field. The apparatus comprises a plurality of coils or coil sets interconnected by a plurality of individual circuits. A plurality of independent control means are provided for varying the magnitude and direction of current in the respective interconnecting circuits and coils. By means of these controls the current supplied to one or more of the coils may be selectively controlled to provide corrective adjustments to one or more orthogonal components of the magnetic field.

This invention relates in general to a means for controlling magnetic fields, and in particular to an improved means for providing corrections to attain a highly precise uniform magnetic field.

Highly uniform magnetic fields are generally required for high resolution apparatus such as used in nuclear magnetic resonance (NMR) spectrometers, for example. However, magnetic fields are subject to non-uniformity and inhomogeneity and, therefore, it is necessary to provide correction means such as magnetic shims and electrical coils to compensate for field irregularities. Various solutions to this problem have been disclosed, as presented in U.S. Patent No. 2,858,504 and patent application Ser. No. 797,775 filed Mar. 6, 1959, Ser. No. 76,679 filed Dec. 19, 1960 now U.S. Patent No. 3,199,021, and Ser. No. 348,442 filed Mar. 2, 1964, now U.S. Patent No. 3,287,630, all assigned to the same assignee. Further description of this subject may be found in an article entitled, "Electrical Current Shims for Correcting Magnetic Fields," by W. A. Anderson in the Review of Scientific Instruments, March 1961, pages 241–250.

For the purpose of explanation and consistency of description, these definitions apply to the following terms:

*Magnetic field vector* $\vec{B}$ is commonly called the magnetic induction or flux density. In a rectangular coordinate system it has the three vector components $Bx$, $By$, and $Bz$; in a spherical coordinate system the vector components are $B^7$, $B^0$, and $B\phi$.

*Linear field gradients* are defined by the mathematical terms $$\frac{dBx}{dx}, \frac{dBx}{dy}, \frac{dBx}{dz}, \frac{dBy}{dx}$$

where $Bx$, $By$, $Bz$ are the vector components defined above. There are nine mathematical derivative expressions of this type.

*Quadratic field gradients* are defined by the mathematical derivative expressions $$\frac{d}{dx}\left(\frac{dBx}{dx}\right), \frac{d}{dx}\left(\frac{dBx}{dy}\right), \frac{d}{dx}\left(\frac{dBz}{dz}\right)$$

There are 27 terms of this type.

*Magnetic field components* relate to a set of physically realizable expansion functions. There may be either a finite or infinite number of expansion functions. This may be expressed mathematically by $$\vec{B} = \vec{B}_1 + \vec{B}_2 + \vec{B}_3 + \cdots + \vec{B}_n + \cdots \vec{B} = \sum_{i=1}^{\infty} \vec{B}_i$$

*Independent field components*: A set of magnetic field components are independent if no component of the set is equivalent to a linear combination of the others. Expressed mathematically the field components $B_1$, $B_2$ . . . $B_n$, are independent if there exists no set of scalar quantities $C_1$, $C_2$ . . . .$C_n$ . . . not all zero such that $$\overrightarrow{C_1B_1} + \overrightarrow{C_2B_2} + \cdots \overrightarrow{C_nB_n} + \cdots = 0 \text{ or } \sum_{i=1}^{\infty} C_iB_i = 0$$

*Orthogonal field components*: Two field components $B_i$ and $B_j$ are orthogonal if the mathematical equation $$\iiint_V \vec{B}_i \cdot B_j dV = 0$$

is satisfied. Here, the integral extends over V, the volume of interest occupied by the magnetic field.

*Independent controls* (which is the subject of this application) relate to a set of controls such that the optimum adjustment of one control is not affected by the adjustment of any of the others.

In the known prior art, analysis of a magnetic field relied generally upon a mathematical expansion of space coordinates, such as spherical coordinates, to derive expressions for orthogonal functions or field components. Generally, separate shims or coil sets have been employed, each coil set for separate control over each different magnetic field component. Each coil or coil set was limited in that it could control or correct only a single field component and, therefore, to attain all the necessary corrections many coils were needed.

It is desirable to have individual controllers which are independent of each other. By independence, one means that the adjustment of one controller does not materially affect the optimum adjustment of any other controller. Heretofore this has been only partially achieved by constructing coils, each of which produces a field that may be described by one of a set of orthogonal potential functions. It has been generally found that this method does not yield individual controls that are independent of each other. At least three conditions must be satisfied if a set of orthogonal type coils is to yield independent controls, and these conditions are difficult to realize.

CONDITION A

The shape of the boundaries surrounding the volume of the field over which the measurement is made must match the boundaries used to define the orthogonality relationship of the set of orthogonal field components. For example, if the field potentials produced by the current shims correspond to independent spherical harmonic solutions then the controls can be independent only if the measurement volume is also spherical. If the measurement volume is a sample in an NMR probe, this sample must be spherical in shape if the controls are to be independent. In regions outside of this spherical volume, the orthogonality is lost. Spherical samples are difficult to build with the required tolerances. Most experimental work in nuclear magnetic resonance is conducted utilizing cylindrical sample volumes and therefore a complete set of coil sets that correspond generally to spherical harmonic solutions would not be independent.

CONDITION B

Orthogonality also implies that any two equal increments of sample volume are weighted equally. Mathematically the fields $B_1$ and $B_2$ arising from two different coils are orthogonal over volume V if $$\iiint_V \vec{B}_1 \cdot \vec{B}_2 dV = 0$$

The controllers that control these same two fields $B_1$ and $B_2$ may not be independent if the sensitivity of the measuring system is not uniform over the volume of measurement. This effect can be illustrated using NMR as the detection system. The contribution of various parts of the sample volume to the signal intensity depends upon the position and distance of that part from the receiver pickup coil. Parts of the sample volume more distant from the coil contribute less to the signal. In some respects this effect is somewhat like that of Condition A. If $\zeta(x,y,z)$ describes this pickup factor of the receiver coil, then to achieve independent controls one must demand $$\iiint \zeta(x,y,z) \vec{B}_1 \cdot \vec{B}_2 dV = 0$$

Sample volume.

If $\zeta$ varies over the sample volume, then both of the above integrals cannot vanish except for very special $\zeta$ functions which are not likely to exist in practice. Thus the condition that independent controls are obtained is that $\zeta$ be constant over the measurement region.

CONDITION C

When one defines independent controls, one must also specify what parameter is being measured when adjusting the homogeneity coil sets. It can be shown that if the RMS field deviation $\delta$ is chosen as the homogeneity parameter, and assuming conditions A and B are satisfied, then a set of mathematically orthogonal functions each with its own control will be independent of each other; i.e., each control can be used to minimize $\delta^2$ independent of the setting of the other controls.

$$\delta^2 = \frac{1}{V} \iiint_V [\langle B_o \rangle - B(x, y, z)]^2 dV$$

where $$\langle B_o \rangle = \frac{1}{V} \iiint_V B(x, y, z) dV$$

V=Sample volume.

If one uses nuclear magnetic resonance, it can be shown that the second moment of an inhomogeneous line shape is a measure of $\delta^2$. However, for the second moment confound in high resolution NMR, the second moment contribution from the natural line width diverges, making the method impractical. Usually some other property, such as the line width, peak height, or number of wiggles during a fast passage through the resonance is used as a measure of the field homogeneity. With previously known mathematically orthogonal type shims it is found that the minimization of the line width, or maximization of the peak height, or number of wiggles does not yield independent controls.

An object of this invention is to provide novel and improved means for controlling a magnetic field.

Another object of this invention is to provide a novel field correction coil apparatus for adjusting the components of a magnetic field.

Another object is to provide controls or adjustments which are independent of each other without restrictive conditions.

A still further object is to provide one control which effects an arbitrary but predetermined field shape, and additional controls which are independent of this one control and independent of each other.

According to this invention, an apparatus for controlling a magnetic field comprises a multiplicity of coils or coil sets, and a plurality of independent controls for varying the magnitude and direction of current in such coils. By means of these controls, one or more of the coils are each adapted to provide more than a single correction to the magnetic field. Multiple adjustments of the field components may be effectuated, with each coil and combination of coils providing several possible adjustments.

The invention will be described in greater detail with reference to the drawings in which.

FIGS. 6A–E illustrates the effect of compensating for a nonuniform field; and

Figure 7A:
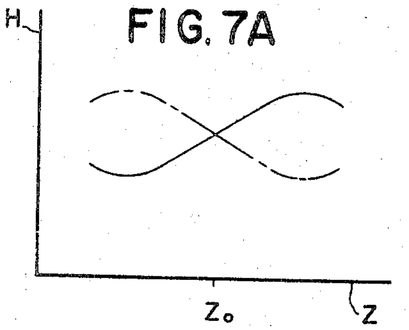
Figure 7B:
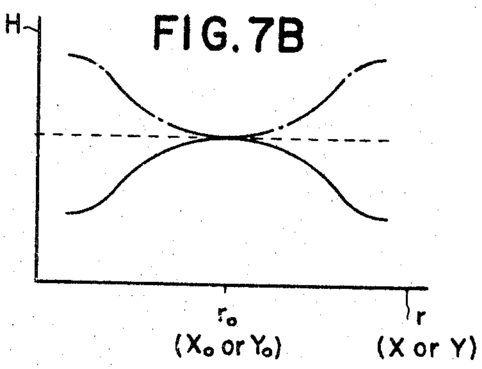

FIGS. 7A–B are plots of magnetic field intensity against distance showing the results of such compensation.

Figures 1, 2:
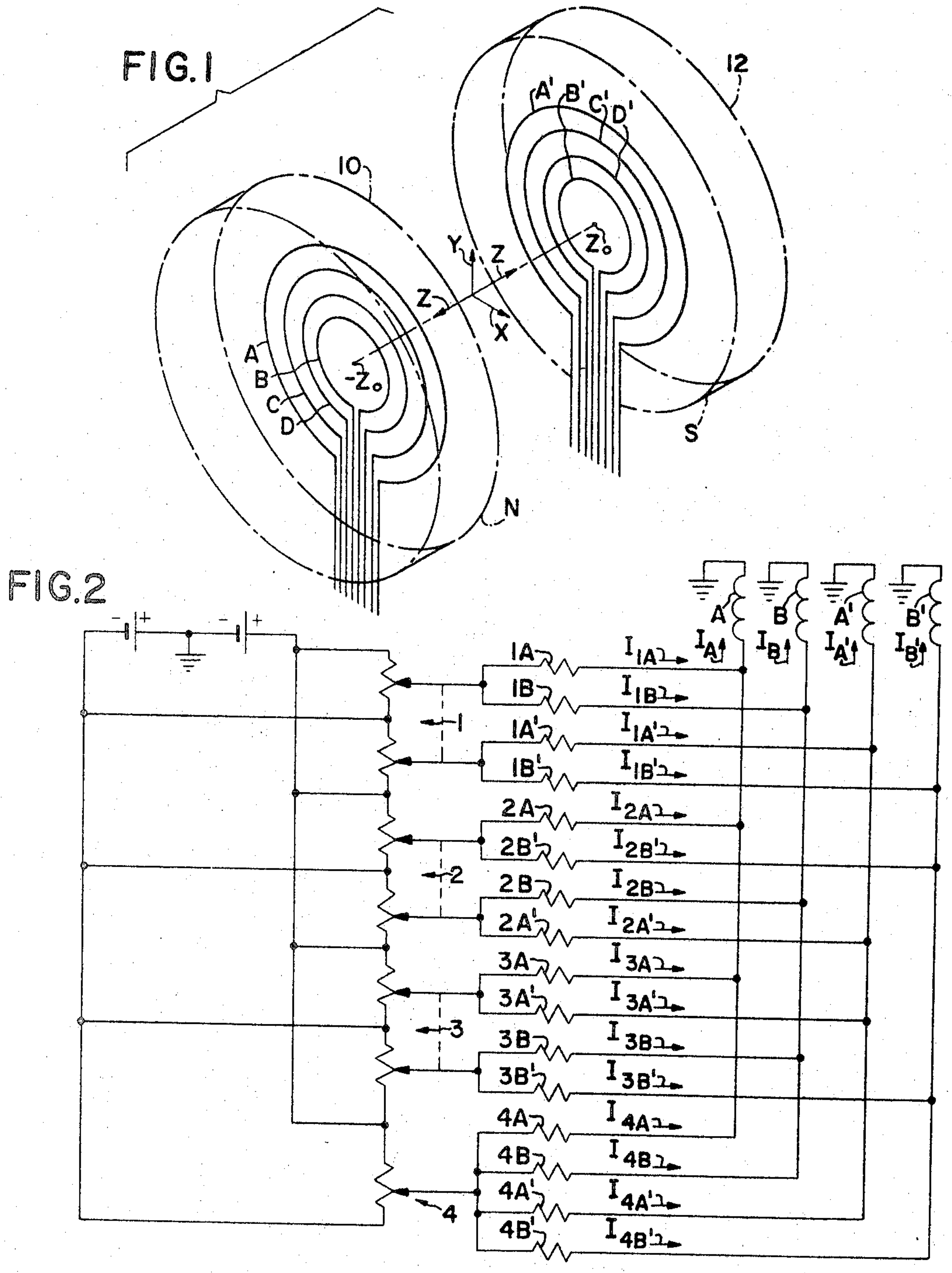
FIG. 1 is a representation of one configuration of coils, in accordance with this invention.
FIG. 2 is a schematic diagram representing a circuit that may be utilized with the configuration of FIG. 1.

In the embodiment of FIG. 1, a pair of oppositely poled magnetic pole pieces 10, 12 are shown spaced along a Z-axis and encompassing a magnetic field therebetween. At the face of each of the pole pieces 10 and 12 respectively is a set of four coils A, B, C, D, and A′, B′, C′, and D′ arranged concentrically with relation to the central Z-axis defined by the pole pieces. The outer coils A and A′ may have a diameter about one-half that of their respective pole pieces, the pole pieces being spaced about one-sixth, of the pole piece diameter, by way of example. The inner coils B and B′ may have a diameter about one-tenth of the diameter of the pole pieces. The leads to and from each coil must be closely spaced to avoid interfering magnetic fields from the currents in the lead wires.

FIG. 2 is a schematic circuit used to illustrate some of the novel features of the present invention. For the purposes of illustration, two coil sets A, A′; B, B′ of the total of the four coil sets of FIG. 1 are used. With these four coils it is possible to have four controllers 1, 2, 3 and 4 that are independent of each other; i.e., the optimum adjustment of one controller is not materially effected by the adjustment of another controller. Here the controllers 1, 2 and 3 consist of two ganged potentiometers. With such a ganged arrangement the currents supplied by any one controller may be positive to one or more coils and negative or zero to the other coils. The coils in this illustration are wound so that the direction of the central field in each coil will be the same if the current signs are the same.

In the arrangement shown here, the resistances of the coils A, A′, B, B′ are made to be small compared to the resistors 1A, 1A′, 1B, 1B′, 2A, 2A′, 2B, 2B′, 3A, 3A′, 3B, 3B′, 4A, 4A′, 4B, and 4B′. This inequality insures that current controlled by one controller will not be substantially altered by the adjustment of the other controllers. For example, the current $I_{1A}$ is controlled by controller 1 and is only very slightly affected by settings of controllers 2, 3, or 4.

The selection of the resistance values 1A, 1B, 1A′, 1B′ of the first controller can be somewhat arbitrary, since the resistors of the other controllers can be selected so that the operation of these other controllers will be independent of controller 1, and independent of each other. Often it is convenient to select the resistance values 1A, 1B, 1A′, 1B′ to effect a particular field component, or field distribution, perhaps one that is produced by a temperature change. Once these values are selected, then resistors controlling the current ratios for the other shims are largely determined by the independent conditions.

By way of example, suppose the resistances 1A, 1B, 1A′, 1B′ are each selected to be 1000, 1500, 1200, 1700 ohms respectively. These values are sufficiently high compared to the resistance of the coils plus their lead wires which are typically less than 10 ohms. Each coil may consist of 20 turns of No. 30 wire and the battery voltages may be 10 volts, so that maximum currents are about 10 milliampers through each coil.

Figure 3:
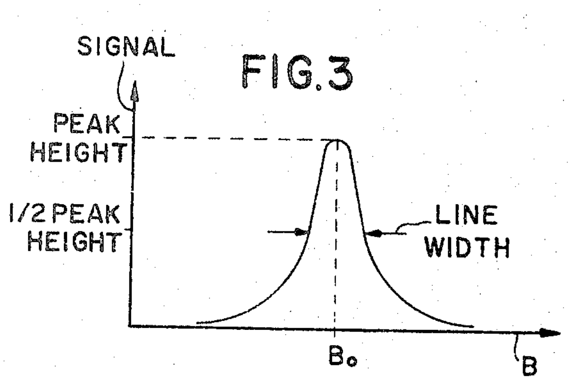
FIG. 3 is a schematic diagram illustrating a nuclear magnetic resonance signal used in accordance with this invention.

Several different procedures may be used to determine the resistances of the other controller circuits. Two of these will now be described. In both, the magnetic field inhomogeneities including the components to be removed by the current shims will be measured by the width of a narrow NMR line of a liquid sample placed in the region of interest. Here the width is defined as the full width at half of the maximum peak height of a nuclear magnetic resonance absorption line as is illustrated in FIG. 3. The natural width of the line must be small compared to the magnetic field inhomogeneities over the sample volume.

Although the measurement of the line width will be used as a measure of the field homogeneity in the illustrations below, an equally good criterion would be a measure of peak height of the line. As the field becomes more homogeneous the line width will narrow and the peak height increase so that the total area remains unchanged. Other parameters, such as the second moment or the number of wiggles in a rapid passage experiment, could also be used as a measure of the magnetic field homogeneity.

In the first procedure the magnetic field inhomogeneities including the components to be removed by the current shims will be introduced into the magnetic field if they are not already present. An easy way to introduce a large field gradient is to place a small ferromagnetic body near the sample volume. Here are the steps that may be used to select the resistance values 2A, 2A′, 2B, 2B′.

(1) Set controllers 2, 3, and 4 so that they introduce no currents into the coils. This can be done by adjusting them to their midpoints, or these circuits can be simply disconnected.

(2) Adjust control 1 to yield a line of minimum width.

(3) Replace the resistors 2A, 2B, 2A′ and 2B′ with 0–50,000 ohm rheostats; initially set each rheostat to approximately 1000 ohms.

(4) Adjust controller 2 to obtain a minimum line width.

(5) Adjust the four rheostats in order, adjusting each to produce a line width minimum. After each has been adjusted once, go back and readjust each again for minimum width. This process should be repeated until further repeating of this cycle results in no further change of the rheostats. Since these adjustments are not independent a large number of trials may be necessary before this result is achieved.

(6) The resistance values of the final settings of the rheostats are measured and fixed resistors proportional to the value of the rheostat that they replace are put back into the circuit.

Controller 2 is now substantially independent of controller 1. The resistors 3A, 3B, 3A′, 3B′ are now determined in similar manner. Since by previous adjustment the dominant gradients may have been cancelled, additional field inhomogeneity may put in at this point First controllers 1 and 2 are adjusted for minimum line width with controllers 3 and 4 set for zero current. The rheostats are now substituted for resistors 3A, 3A′, 3B, 3B′ and initially adjusted to approximately 1000 ohms each. The current in controller 3 is adjusted for minimum line width. Steps 5 and 6 above are then repeated for this controller. A similar procedure is then used to determine the resistors 4A, 4A′, 4B, and 4B′.

In the above example the arrangement of currents controlled by controller 1 was completely arbitrary, and all of the controllers were made to be indepedent of each other. Sometimes it is convenient (but unnecessary) to sort the controllers into two separate groups based upon symmetry. In the symmetric groups the currents on the two pole faces have equal magnitudes but opposite directions. For example, controllers 1 and 2 will belong to the antisymmetric group if resistors 1A=1A′, 1B=1B′, 2A=2A′, and 2B=2B′. Controllers 3 and 4 will belong to the symmetric group if resistors 3A=3A′, 3B=3′, 4A=4A′, and 4B=4B′.

The symmetry considerations discussed above are based upon a reflection plane parallel and equally distant from the two parallel planes containing the coils A,B and A′B′. In FIG. 1 this plane is located at Z=0, and the planes containing the coils are located at $Z=\pm Z_0$. If the sample volume is centered in this reflection plane and is symmetric upon reflection in this plane and if the pickup factor $\zeta(x,y,z)$ is also symmetric, i.e., $\zeta(x,y,z)=\zeta(x,y-z)$ destroy the symmetry and any two controllers belonging to different symmetry groups will be indepenedent. If these restrictions are placed upon the resistors, the remaining pairs of controllers can be made to be independent by a slight modification of the procedure outlined above. This modified procedure will now be described.

The first controller has resistors 1A=1A′ and 1B=1B′, leaving just two parameters to be determined. The condition that these resistors have a resistance high compared to the individual coil plus lead resistance can be used to determine one parameter. For example, resistor 1A=1A′=1000 oms can be selected. The size of the resistance 1B=1B′ is arbitrary and as mentioned before it can be chosen to give a predetermined field shape.

Next the ratio of resistances 2A to 2B must be determined. This can be done by following the steps 1–6 above with the simple modification that the rheostate replacing the resistors 2A and 2A′ must be ganged so that they always have the same resistance, and the rheostats replacing resistors 2B and 2B′ must be similarly ganged.

Within the limitation resistor 3A=3A′, 3B=3B′ and the condition upon the minimum size of the resistances, an arbitrary choice can be made upon the resistance ratio 3A/3B. For example, this choice might be made by the condition that adjustment of controller 3 cause no change in the average value of the magnetic field over the sample region.

Selection of the resistance ratios 4A to 4B so that controller 4 is independent from controller 3 is done by following steps 1–6 above with the modifications mentioned above.

In its present form controller 4 will also change the average value of the magnetic field. This may be of little consequence in many applications. In applications where it is important that the average field remain unchanged, one or more additional coil sets may be used; for example, coils C, C′, D, and D′ of FIG. 1.

The only requirement for both procedures set forth herein is that the coils are non-equivalent. The coils are non-equivalent if the magnetic field over the sample volume which is produced by passing a current through one coil is not identical with a magnetic field produced by currents in any other coil or some combination of currents in the other coils. Coils of different shape or size or identical coils located at different positions generally are non-equivalent.

The second procedure mentioned above to determine the current ratios or resistances so that the various controllers are independent from each other will now be described. In this method one starts in a relatively uniform field so that the controllers can be used to introduce sufficient inhomogeneities to greatly broaden the original line width.

In this method as in the first one outline, the resistance ratios of the first controller are quite arbitrary, and the other controllers are made to be independent of this one and independent of each other.

This second method involves the experimental determination of the lack of independence of the original set of coils, and from this information a suitable set of connections with proper current ratios are determined. Even through the coils are non-equivalent, any set of controllers each controlling the current through just one coil will not be independent. This non-dependence can be quantitatively measured. If one has N non-equivalent coils, then there can be at most $N^2$ resistive circuits required to select the current ratios for the N independent controllers.

There are a total of $(\frac{1}{2})N(N-1)$ different pairs of coils so that if one requires that each pair be independent, a total of $\frac{1}{2}N(N-1)$ equations or relationships must be satisfied. This leaves $\frac{1}{2}N(N+1)$ additional constants or relationships that can be arbitrarily chosen subject only to the restrictions that all of the resistances are large compared to the coil plus lead resistances and are consistent with the other $\frac{1}{2}N(N-1)$ relationships.

As an example, consider again the system illustrated in FIG. 2 where $N=4$. Consider the special case discussed above with the resistances $1A=1A'$, $1B=1B'$, $2A=2A'$, $2B=2B'$, $3A=3A'$, $3B=3B'$, $4A=4A'$, and $4B=4B'$. The particular coil symmetry and the above choice of resistances has made controllers 1 and 2 independent of controllers 3 and 4 so that four of the $\frac{1}{2}N(N-1)=6$ relationships have been satisfied. Controllers 1 and 2 will be independent if $$\frac{R_{2B}}{R_{2A}}=\frac{R_{1A}+K_1R_{1B}}{R_{1B}+K_1R_{1A}}$$

and controllers 3 and 4 will be independent if $$\frac{R_{4B}}{R_{4A}}=\frac{R_{3A}-K_2R_{3B}}{R_{3B}-K_2R_{3A}}$$

where $R_{1A}$, $R_{1B}$, $R_{2A}$, $R_{2B}$ are the resistances of 1A, 1B, 2A, 2B . . . of FIG. 2. The constants $K_1$ and $K_2$ are factors that can be determined by experiment as follows:

(1) Place the shims in a homogeneous magnetic field.

(2) Let resistors $1A=1A'$ and $2B=2B'$. Remove resistors 1B, 1B', 2A, and 2A' so that no currents will flow in these leads. Turn off all other controllers.

(3) Adjust controller 1 so that the NMR line appreciably broadens. Measure the current $I_{1A}$ in the lead containing the resistor 1A.

(4) Now adjust controller 2 until a minimum line width is obtained. Measure the current $I_{2B}$ through resistor 2B at this minimum. The quantity $K_1$ is then given by $$K_1=\frac{I_{2B}}{I_{1A}}$$

(5) Next turn off controllers 1 and 2 and let resistors $3A=3A'$, $4B=4B'$, and remove resistors 3B, 3B', 4A, and 4A'.

(6) Now adjust controller 3 so that the NMR line is appreciably broadened. Measure the current in resistor 3A and call it $I_{3A}$.

(7) Adjust controller 4 so that a minimum line width is obtained. Measure the current through resistor 4B at this minimum, and call it $I_{4B}$. The quantity $K_2$ is given by $$K_2=\left|\frac{I_{4B}}{I_{3A}}\right|$$

Using values of $K_1$ and $K_2$ determined in this way one may determine the ratios $R_{2B}/R_{2A}$ and $R_{4B}/R_{4A}$ from the relationships above. This procedure yields controllers that are independent of each other.

Although the procedures above have been illustrated by relatively simple cases the methods can be applied to situations with a large number of coils to yield independent controllers. Independence is obtained without the use of special coils which are calculated to yield independent controls. Here the coils at hand are used and independence is achieved taking the measuring device and the actual coils into account. No assumptions or approximations as to the coil geometry are made. One coil can be common to many controllers so that the number of coils is minimized.

Figure 4:
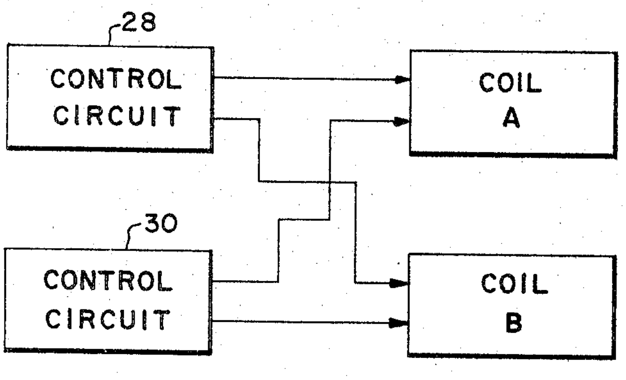
FIG. 4 is a simplified block diagram that will aid in the explanation of the invention.

The basic logic utilized in this invention is depicted by the simplified block diagram of FIG. 4. Control circuits 28 and 30 are coupled to coils A and B, by way of example, such that coils A and B may be adjusted by either control circuit 28 or 30, or by the combination of both circuits. Thus, coil A may receive a greater or lesser, or more positive or more negative current. Similarly, coil B may be varied independently by circuits 28 and 30, or interdependently with coil A by one or both circuits. It is apparent that multifold variations in coil current are made possible, whereby two coils can provide various field corrections. This arrangement is in sharp contrast to known field correction assemblies wherein a single independent current control is utilized for each coil or set of coils in the assembly. In such prior art devices, additional coils of predetermined shape and size are introduced as needed, for each separate correction, usually in accordance with mathematical formulae and derivations.

Figure 5:
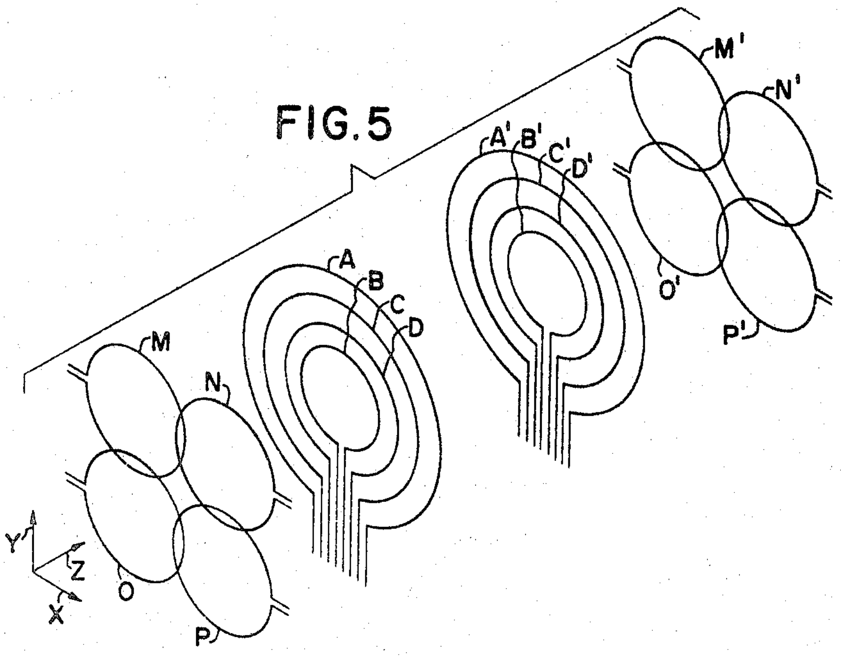
FIG. 5 is a representation of another embodiment of a coil configuration, according to this invention.

In FIG. 5, another embodiment, which is described and claimed in the aforementioned copending patent application to F. Nelson, utilizes the sets of coils A, B, C and D for pole piece 10 and A', B', C' and D' for pole piece 12 shown in FIG. 1. In addition, a set of interlaced or overlapping coil sets M, N, O and P for pole piece 10 and M', N', O' and P' for pole piece 12 are employed. The two sets of coils for each pole piece are positioned closely to each other on the face of the respective pole pieces and substantially in the same effective plane.

FIG. 5 depicts another configuration of coils than that shown in FIG. 1 which may be used with the resistive circuit of FIG. 2. It is to be understood that the same circuit may be used with the coils M, N, O, P, or with coils M', N', O', and P' in the same manner, or may be enlarged to control all of the coils. The coils in this illustration are wound so that the direction of the central field in each coil will be the same if the current signs are the same.

Figure 6A:
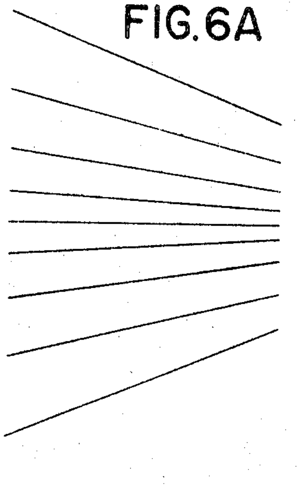
Figure 6B:
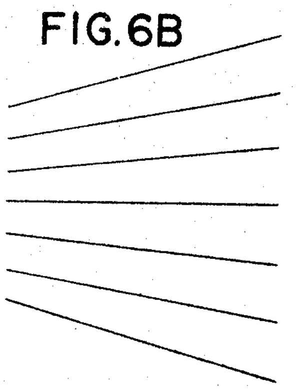
Figure 6C:
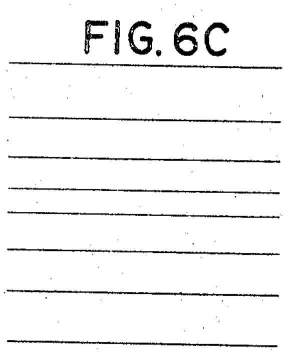
Figure 6D:
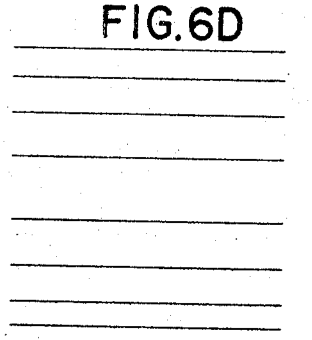
Figure 6E:
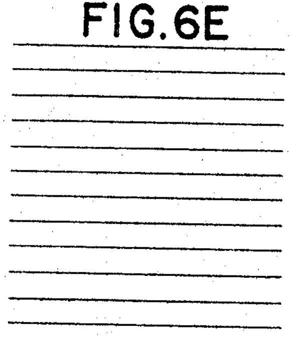

FIG. 6A depicts flux lines at the portion of an NMR sample being investigated. The flux density is proportional to the number of lines per unit area. If a field such as shown in FIG. 6B is superimposed upon the one of FIG. 6A, the resultant has a consistent flux density in one direction, i.e., the horizontal, but not in the other or vertical direction, as seen in FIG. 6C. However, if an additional field (FIG. 6D) is superimposed upon the resultant (FIG. 6C), then a substantially uniform flux density over the portion of interest of the sample is obtained, as evidenced by FIG. 6E. The several field shapes represented in FIG. 6 may be a cross-section of a radially symmetrical field, in which case the coils which produce field configurations such as illustrated in FIGS. 6B and 6D could be concentric coils, with the current programmed to give the desired shapes and magnitudes of the correcting field.

FIG. 7A serves to illustrate the relationship between the field relative to the Z-axis, with a reference point $Z_0$ defining the midpoint of an air gap between opposing pole pieces of a magnet. FIG. 7B depicts a plot of field intensity with respect to the orthogonal directions, X or Y, when referenced to the Z-axis.

With the arrangement of this invention, second and fourth order field components may be adjusted simultaneously with a single control, and first and third order components may be removed concurrently with a single adjustment. Also, curvature control can be accomplished with one set of coils.

Since many changes can be made in the above construction and many apparently widely different embodiments of this invention could be made without departing from the scope thereof, it is intended that all matter contained in the above description or shown in the accompanying drawing shall be interpreted as illustrative and not in a limiting sense.

For example, the fixed resistors shown in FIG. 2 can be independently adjustable resistors to permit the exact ratio selection of the current in coil sets for an initial setting. Separate variable resistors singly or in combination, can be used for initial adjustments of field gradients.

Various combinations of resistors and coils may be utilized within the scope of this invention. For any one coil, several resistive circuit combinations are possible. Since the resistances may be externally located with relation to the magnetic field gap, space saving is realized. Furthermore, resistors can be much less expensive than shim coils and thus it is often preferable to use additional resistors in lieu of coils when additional corrections are desired. The variable resistance means in combination with the fixed resistors, which are set initially, allow more than a single correction for any one coil.

What is claimed is:

1. Apparatus for adjusting the components of a magnetic field comprising:
- spaced magnetic pole elements having faces encompassing a nonmagnetic gap for establishing a magnetic field;
- a multiplicity of coils disposed adjacent to at least one of said faces, a plurality of said coils being interconnected in different combinations; and
- a plurality of controls, each coupled to a respective one of the different combinations, for varying the magnitude and current of the coils of said combinations, whereby each control separately and independently controls a different magnetic field component.

2. Apparatus as in claim 1 wherein said coil combinations are coupled to a common power supply.

3. Apparatus as in claim 1 wherein each of said controls comprises at least one fixed resistance and at least one variable resistance coupled to each coil.

4. Apparatus as in claim 3 wherein the resistance of any of said coils is substantially less than any of the resistances coupled to such coil.

5. Apparatus as in claim 1 wherein each of said controls comprises a plurality of fixed resistances and a plurality of variable resistances coupled to each coil.

6. Apparatus as in claim 5 wherein said variable resistances include a plurality of adjustable potentiometers.

7. Apparatus as in claim 6 wherein at least two of such potentiometers are mechanically ganged together.

8. Apparatus as in claim 1 including a first group of concentric coils disposed adjacent to one face and a second group of like concentric coils disposed adjacent to the other face.

9. Apparatus as in claim 8 further including a third group of interlaced electrical coils disposed adjacent to said first group of coils, and a fourth group of interlaced electrical coils disposed adjacent to said second group of coils.

10. Apparatus as in claim 1 wherein the pole elements are cylindrical, and the largest coil adjacent to each face has a diameter approximately ½ that of its respective pole face, said pole elements being spaced at a distance approximately ⅙ of the diameter of the pole faces.

11. Apparatus as in claim 10 including coils smaller than and concentric with said largest coils, said smaller coils having a diameter about $\frac{1}{10}$ of that of the pole faces.

12. Apparatus for forming a substantially uniform magnetic field comprising: a pair of oppositely poled spaced magnetic bodies having first and second surfaces respectively facing each other; a set of coils positioned adjacent said first surface; a like set of coils positioned adjacent said second surface; a power supply; first and second variable resistances coupled to said power supply; first and second fixed resistances of each coil being coupled respectively to said first and second variable resistances so that any change in either variable resistance changes the currents in said coils simultaneously.

13. Apparatus for forming a substantially uniform magnetic field as in claim 12 wherein the coils of each set are concentric.

14. Apparatus for forming a substantially uniform magnetic field as in claim 13 further including an additional set of coils disposed in a rectangular configuration and positioned adjacent to said concentric coils, each coil of said additional set being coupled to the power supply through a plurality of fixed resistances and variable resistances.

15. Apparatus for enabling the independent adjustment of one or more orthogonal components of a given magnetic field comprising: a plurality of coil means disposed proximate to said magnetic field, said coil means being simultaneously interconnected by a plurality of different circuit means, current supply means for energizing said coil means, and a plurality of control means for selectively varying the currents applied to said coil means each coupling said current supply means to said coil means through one of said circuit means whereby certain predetermined magnetic field components may be controlled by each of said control means.

16. Apparatus for enabling the independent adjustment of one or more orthogonal components of a given magnetic field as recited in claim 15 wherein said coil means are disposed about an axis generally parallel to the direction of said magnetic field.

References Cited

UNITED STATES PATENTS 3,034,040 5/1962 Williams ---------- 317—123 X
3,213,355 10/1965 Woessner ------------ 324—.5

FOREIGN PATENTS 373,579 11/1963 Switzerland.

JOHN F. COUCH, Primary Examiner

R. V. LUPO, Assistant Examiner

U.S. Cl. X.R.

317—157.5; 324—.5